United States Patent [19]

Collister

[11] 4,451,610
[45] May 29, 1984

[54] PREPARATION OF CURABLE SOLID POLYESTER RESIN PELLETS AND POWDERS

[75] Inventor: Jon E. Collister, Austinburg, Ohio

[73] Assignee: Premix, Inc., North Kingsville, Ohio

[21] Appl. No.: 302,814

[22] Filed: Sep. 16, 1981

Related U.S. Application Data

[63] Continuation of Ser. No. 47,330, Jun. 11, 1979, abandoned.

[51] Int. Cl.³ .......................... C08L 67/06; C08K 3/22
[52] U.S. Cl. ........................................ 525/19; 524/514
[58] Field of Search ............................ 525/19; 524/514

[56] References Cited

U.S. PATENT DOCUMENTS

| | | | |
|---|---|---|---|
| 2,568,331 | 9/1951 | Frilette | 525/19 |
| 2,628,209 | 2/1953 | Fisk | 523/514 |
| 2,632,751 | 3/1953 | Anderson | 523/207 |
| 2,998,399 | 8/1961 | Petropoulos | 525/440 |
| 3,006,897 | 10/1961 | Parker | 528/73 |
| 3,035,026 | 5/1962 | Stephens | 525/431 |
| 3,446,758 | 5/1969 | Wiener | 521/48.5 |
| 3,467,619 | 9/1969 | Raichle et al. | 523/514 |
| 3,631,217 | 12/1971 | Rabenoid | 525/15 |
| 3,763,079 | 10/1973 | Fryd | 252/62.54 |
| 3,766,129 | 10/1973 | Pesez | 523/514 |
| 3,850,886 | 11/1974 | Doss | 525/437 |
| 3,879,318 | 4/1975 | Forsyth | 523/508 |
| 3,926,902 | 12/1975 | Bowen | 523/509 |
| 3,959,209 | 5/1976 | Lake | 523/527 |
| 3,991,034 | 11/1976 | Takeo et al. | 525/440 |
| 3,993,627 | 11/1976 | Sekmakas et al. | 525/123 |
| 4,038,254 | 7/1977 | Schade et al. | 528/274 |
| 4,048,128 | 9/1977 | Eastman | 524/147 |
| 4,064,194 | 12/1977 | Evans et al. | 528/75 |
| 4,080,317 | 3/1978 | Morawetz et al. | 525/437 |
| 4,100,137 | 7/1978 | Lemieux et al. | 525/154 |
| 4,104,265 | 8/1978 | deZarauz | 525/68 |
| 4,119,614 | 10/1978 | King et al. | 528/283 |
| 4,120,848 | 10/1978 | Mori et al. | 528/67 |
| 4,128,537 | 12/1978 | Markiewitz | 528/49 |
| 4,190,714 | 2/1980 | Isaksen et al. | 525/163 |
| 4,190,715 | 2/1980 | Isaksen et al. | 525/163 |

OTHER PUBLICATIONS

Burns et al., "Variability in Sheet Moulding Compound (SMC): Part I, The Thickening Reaction and Effect of Raw Materials", *Plastics and Polymers*, Dec. 1975.

Burns et al., "Variability in Sheet Moulding Compound (SMC): Part II, Processing and Moulding Variability", *Plastics and Polymers*, Dec. 1975.

*Primary Examiner*—John C. Bleutge
*Assistant Examiner*—Robert E. L. Sellers
*Attorney, Agent, or Firm*—Maky, Renner, Otto & Boisselle

[57] ABSTRACT

A method of preparing curable solid polyester resin pellets and powders comprising (a) preparing a liquid mixture consisting essentially of an unsaturated polyester resin, at least one monomeric unsaturated polymerizable material containing a terminal ethylene group, and an alkaline earth metal oxide or hydroxide in an amount effective to provide a desired increase in viscosity, (b) allowing the liquid mixture to stand until the alkaline earth metal oxide or hydroxide and the polyester co-react, and a desired increase in viscosity has been attained, (c) dispersing in the mixture obtained in (b), a polymerization initiator and a filler, fibrous reinforcing material, pigment or mold release agent, or mixtures thereof, (d) extruding the mixture obtained in (c) to form dry, free-flowing pellets or powders is described. The pellets and powders prepared in this manner are specifically suitable for molding techniques such as injection, compression or transfer molding operations.

20 Claims, No Drawings

PREPARATION OF CURABLE SOLID POLYESTER RESIN PELLETS AND POWDERS

This is a continuation of application Ser. No. 047,330, filed June 11, 1979 abandoned.

BACKGROUND OF THE INVENTION

This invention relates to a method of preparing curable solid polyester resin pellets and powders, and more particularly, to amorphous solid polyester resin pellets and powders.

Various thermosettable polyester compositions are known which, when molded, exhibit desirable mechanical and electrical properties. Polyester resins are widely used in molding applications in liquid form. Such liquid resins comprise a liquid solution of a liquid or solid polyester dissolved in a liquid cross-linking agent such as, for example, styrene. However, for many types of molding applications, it is desirable that the polyester resin be in solid form, for example, in the form of sheets, granules or powders.

Solid forms of polyester resin have been prepared from liquid polyester resin solutions of the type mentioned above. For example, a normally liquid polyester resin solution can be converted into a solid form by the addition thereto of a chemical thickening agent such as an oxide or hydroxide of magnesium or calcium. Alternatively, the liquid polyester resin solution can be converted into a solid form by adding thereto a solid filler, such as calcium carbonate which absorbs the liquid resin. For example, a doughy mass or other form of solid resin can be obtained by adding sufficient filler to the liquid resin as disclosed in U.S. Pat. No. 2,632,751.

These well known methods for converting liquid polyester resins to solid forms are not totally satisfactory for certain molding processes, more particularly injection molding. For example, the tough, rubbery sheets that are produced from a chemically thickened polyester resin cannot be satisfactorily ground into pellets or powders which is a desirable form of the curable resin for a molding operation such as by screw injection molding.

Another disadvantage in relying on the use of fillers to absorb sufficient amounts of a liquid resin containing an amorphous polyester in order to provide a solid resinous composition is that the properties of the articles made from the cured composition can be affected adversely. For example, when high proportions of filler are used to thicken the composition, the strength of the articles made therefrom generally is reduced.

U.S. Pat. No. 3,431,320 describes a process for increasing the viscosity of unsaturated polyester resins dissolved in an ethylenically unsaturated copolymerizable monomer by adding a mixture of calcium oxide and either calcium hydroxide or magnesium oxide to the polyester resin. It is reported that these compounds initially inhibit the viscosity build-up which permits application of the polyester resin to fiber substrates prior to thickening. U.S. Pat. No. 2,568,331 describes copolymers of styrene and unsaturated polyesters and the conversion of such copolymers to solid polymers utilizing an organic peroxide in combination with an alkaline earth metal oxide or hydroxide.

U.S. Pat. No. 2,628,209 describes the use of liquid mixtures of polymerizable vinyl compounds and polyolefinic alkyds containing free radical catalysts and magnesium oxide for impregnating or application to absorptive or porous sheet materials. After the sheet materials are treated, the magnesium oxide reacts causing the viscosity to increase. Thus when the impregnated fabric is heated for curing, the viscosity remains high enough so that the resin does not run off. Alternatively, liquid polymerizable resins of high viscosity can be prepared by mixing low viscosity resin with pigments, dyes, catalysts, etc., and thereafter adding magnesium oxide to thicken the mixture.

U.S. Pat. No. 3,959,209 describes the preparation of solid, curable crystalline polyester resin compositions which does not depend upon chemical thickening agents. Amorphous polyesters can be utilized in combination with the crystalline polyesters.

U.S. Pat. No. 3,926,902 describes thermoset compositions which are dry and free-flowing. The composition comprises a mixture of an unsaturated thermosetting polyester, a polymerizable cross-linking agent, a free-radical initiator and a filler material and/or reinforcing agent selected from organic and inorganic fibers. The polyesters used in the composition are those which normally melt at a temperature above about 65° C.

SUMMARY OF THE INVENTION

It now has been discovered that curable solid polyester compositions can be prepared which are dry and free-flowing pellets and powders useful for injection, compression or transfer molding operations. In particular, the present invention relates to a method of preparing curable solid polyester resin pellets and powders comprising
  (a) preparing a liquid mixture consisting essentially of an unsaturated polyester resin, at least one monomeric unsaturated polymerizable material containing a terminal ethylene group, and an alkaline earth metal oxide or hydroxide in an amount effective to provide a desired increase in viscosity,
  (b) allowing the liquid mixture to stand until the alkaline earth metal oxide or hydroxide and the polyester co-react, and a desired increase in viscosity has been attained,
  (c) dispersing in the mixture obtained in (b), a polymerization initiator and a filler, fibrous reinforcing material, pigment or mold release agent, or mixtures thereof,
  (d) extruding the mixture obtained in (c) to form dry, free-flowing pellets or powders.

Alternatively, curable solid polyester resins and pellets can be prepared from a melted polyester resin mixed with an alkaline earth metal oxide or hydroxide followed by dispersion into the mixture of an unsaturated polymerizable monomer containing a terminal ethylene group, a polymerization initiator and other additives such as fillers, pigments, mold release agents, etc.

DETAILED DESCRIPTION OF THE INVENTION

This invention relates to methods of producing thermoset polymers of increased molecular weight, and more specifically to methods of processing these higher molecular weight polymers into solid polymerizable thermoset compositions. The higher molecular weight polymers can be distinguished from their low molecular weight precursers by the appearance of a plateau region in the viscoelastic spectrum for the higher molecular weight material which is nonexistent in the viscoelastic spectrum of the lower molecular weight precursers.

In one embodiment of the invention, the solid polyester resin pellets and powders are prepared by first dissolving an unsaturated polyester resin in at least one monomeric unsaturated polymerizable material containing a terminal ethylene group. In an alternative embodiment, the polyester resin is not initially contacted with the monomeric unsaturated polymerizable material. In this alternative embodiment, the polyester resin, if a liquid, is mixed with the alkaline earth metal oxide or hydroxide, and after undergoing thickening, the unsaturated material containing the terminal ethylene group is added to the thickened polyester resin along with other desirable ingredients such as polymerization initiators. When the starting polyester resin is a low melting point solid, the alternative embodiment comprises mixing the alkaline earth metal oxide or hydroxide with a melted polyester resin, and after heating the fluid mixture to obtain the desired increase in viscosity. The unsaturated polymerizable monomer containing a terminal ethylene group and other desirable components thereafter are dispersed into the thickened polyester resin.

Unsaturated polyester resins which are useful in the method of the invention are well known in the art. The unsaturated polyesters are condensation polymers derived by the condensation of unsaturated dibasic acids or anhydrides with di-hydroxy compounds. The polyesters may include in the polymeric chain, varying proportions of other saturated or aromatic dibasic acids and anhydrides which are not subject to cross-linking. The particular non-cross-linking components and their properties will depend upon the desired properties of the final products. Independent of the composition of the polyester resin, the polyesters should be prepared in a manner such that the polyesters have an acid number of between about 10 and 100. This acid functionality is used to react with the alkaline earth oxides and hydroxides to produce the desired increases in molecular weight and viscosity.

Examples of unsaturated dibasic acids or anhydrides which are utilized in the formation of the polyester resins include maleic acid, fumaric acid, itaconic acid, tetrahydrophthalic anhydride, etc. Examples of saturated aliphatic dicarboxylic acids include adipic and succinic acids, and examples of aromatic dicarboxylic acids include phthalic acid, isophthalic acid, terephthalic acid and halogenated derivatives such as tetrachlorophthalic acid and anhydride.

Examples of di-hydroxy and tri-hydroxy compounds include ethylene glycol, propylene glycol, 1,2-butanediol, 1,3-butanediol, 1,4-butanediol, diethylene glycol, dipropylene glycol, glycerol, neopentyl glycol, and reaction products of alkylene oxides with, for example, 2,2'-bis(4-hydroxy phenylene)propane, (Bis-phenol A).

The polyesters are prepared by reacting the one or more dibasic acids or anhydrides with the di- or tri-hydroxy compounds in approximately equal proportions. Examples of such polyesters include: maleic anhydride and propylene glycol (1:1 molar ratio); isophthalic acid, maleic anhydride and propylene glycol (1:2:3 and 1:1:2 molar ratios); and adipic acid, maleic anhydride and propylene glycol (1:2:3 molar ratio). The degree of polymerization of polyester resins is conveniently measured with respect to the acid end groups. One gram of the polyester resin is titrated with potassium hydroxide, and the number of milligrams of potassium hydroxide necessary to neutralize the gram of polyester is called the acid number. It is preferred for purposes of this invention that the acid number of the polyester resin utilized in the method be below 100, and is generally between about 10 and 100. Moreover, the polyester resins utilized in the method of the invention are characterized as being amorphous polyesters. A wide variety of such polyester resins is available commercially from various sources.

In one embodiment of the present invention, the unsaturated polyester is dissolved in at least one monomeric unsaturated polymerizable material containing a terminal ethylene group. Preferably, the terminal ethylene group is attached to an electronegative group such as the phenyl group as in styrene, halogen as in vinyl chloride, the acetoxy group as in vinyl acetate or the carbethoxy group as in ethyl acrylate. Examples of such compounds include styrene, alpha-methyl styrene, chloro styrene, vinyl toluene, divinyl benzene, diallylphthalate, methyl methacrylate, etc. The particular monomeric unsaturated polymerizable material selected for use in the method of the invention should be a material which is capable of dissolving the polyester resin, preferably at room temperature. The amount of unsaturated monomer such as styrene or vinyl toluene included in the mixture generally is from about 10 to about 60% and preferably from about 30 to about 50% by weight of the mixture of monomer and polyester. Alternatively, the liquid mixture of polyester resin and vinyl monomer will contain from about 3 to 5 parts by weight of the monomer for each 10 parts of polyester resin.

To the above described liquid mixture, there is added an alkaline earth metal oxide or hydroxide in an amount effective to provide a desired increase in viscosity on standing. The increase in viscosity should be sufficient to provide a thickened mixture which can be converted to a free-flowing dry powder or pellet by extrusion after addition of polymerization initiator, pigment, mold release agents, etc. The amount of alkaline earth metal oxide or hydroxide required to produce the desired increase in viscosity will vary depending on the particular polyester and polymerizable material containing a terminal ethylene group, but such amount can be determined easily by one skilled in the art. Examples of the alkaline earth oxides which are useful include magnesium oxide, zinc oxide and calcium oxide. The corresponding hydroxides also can be utilized in the method of the invention. In the present invention, magnesium oxide and zinc oxide are preferred. Also in the preferred embodiment, the liquid mixture which is prepared consisting essentially of the unsaturated polyester resin, the unsaturated monomer material, and the alkaline earth metal oxide or hydroxide will contain from about 1 to about 5% by weight of the alkaline earth metal oxide or hydroxide.

In addition to the above materials, the liquid mixture also may contain water or an organic thickening composition in an amount of up to about 5% by weight. Examples of useful thickening agents include organic aldehydes, ketones, alcohols, amines and amides. The preferred amides are acid amides such as formamide. The use of acid amides for increasing the rate of polyester reactions with alkaline earth oxides and hydroxides is described in U.S. Pat. No. 3,879,318, which disclosure is incorporated by reference.

The above described mixtures, with or without the organic accelerator, are allowed to stand until the alkaline earth metal oxide or hydroxide and the polyester co-react thereby providing a desired increase in the viscosity of the mixture. Heat may be applied to the mixture to increase the thickening rate. The desired viscosity is the viscosity which will enable the mixture, after incorporation of a polymerization initiator, to be extruded into dry, free-flowing pellets or powders. The material of desired viscosity which represents an increase of molecular weight can be distinguished from the low molecular weight precursers by the appearance of a plateau region in the viscoelastic spectrum for the higher molecular weight material. The plateau region is non-existent in the viscoelastic spectrum of the precursers. The degree of reaction between the alkaline earth metal oxide or hydroxide with the polyester can be monitored by determining the viscosity rise of the polymer solution, monitoring the increase in relaxation time of the polyester solution, determining the intrinsic viscosity of the resultant resin, or performing molecular weight analysis using standard gel permeation chromatography. The desired degree of reaction or viscosity increase generally is achieved in a matter of hours and is determined by the reactivity of the polyester resin, the type of oxide or hydroxide used, and the presence of any accelerators in the mixture.

Alternatively, the formation of the mixture of polyester resin and alkaline earth metal oxide or hydroxide having the desired increased viscosity can be accomplished in the absence of the monomeric unsaturated polymerizable material. In the alternative embodiment, the metal oxide or hydroxide is introduced to the polyester while the polyester is maintained above its melting point. The temperature of the reaction between the metal oxide or hydroxide and polyester is dependent upon the specific melt temperature of the polyester resin employed. The time of the reaction is considerably shorter than the solvent process described above. Typically, desired levels of reaction can be achieved in a matter of minutes, and typical reaction times generally will be between about 5 and 120 minutes.

After the polyester resin mixture has been reacted to form an intermediate product having increased viscosity, whether in solution or neat, a polymerization initiator and other desirable additive components are dispersed in the mixture. If the viscous mixture has been prepared utilizing the melt process, one of the materials added to the thickened mixture is an unsaturated polymerizable monomer containing a terminal ethylene group which serves as a cross-linking agent. Any of the unsaturated polymerizable monomers containing a terminal ethylene group described above with respect to the solvent process can be utilized.

After the mixture has been reacted to provide the desired increase in viscosity, a polymerization initiator is dispersed into the thickened mixture. Generally, the initiator will be a free radical initiator capable of generating free radicals that can initiate cross-linking between the monomer containing the terminal ethylene groups and the polyester resin but will not cause any significant cross-linking of the compositions at low temperatures. In other words, the polymerization initiators must be such that they are sufficiently stable at the temperatures at which the pellets and powders of the invention are formed so that the compositions do not prematurely cross-link and become thermoset. Preferably, the polymerization initiators are chosen from materials which contain either a peroxide group or an azo group. Examples of peroxide compounds include t-butyl perbenzoate, t-butyl peroctoate, benzoyl peroxide, t-butyl hydroperoxide, succinic acid peroxide, cumene hydroperoxide and dibenzoyl peroxide. Examples of typical azo compounds which can be utilized include azo-bis-isobutyronitrile and t-butylazo-isobutyronitrile. Generally, amounts of from about 0.5 to about 2% by weight based on the weight of the combined weight of polyester and monomer are utilized in preparing the pellets and powders of the invention.

Other ingredients which may be dispersed into the thickened polyester resin prior to extrusion to obtain special effects include one or more of the following: fillers, fibrous reinforcing materials, pigments, and mold release agents.

Fillers are added to the resin mixture as extenders and to impart such properties as reduction in shrinkage and tendency to crack during curing. Fillers also tend to improve stiffness and heat resistance in molded articles. Examples of fillers that can be utilized in the method of the invention include alumina trihydrate, calcium carbonate, clays, calcium silicate, silica, talcs, mica, barytes, dolomite, solid or hollow glass spheres of various densities.

The particular filler chosen may be dependent upon the cost of such filler, the effect of the filler on mix viscosity and flow properties during extrusion, or the effect that the filler has on properties such as shrinkage, surface smoothness, chemical resistance, flammability and/or the electrical characteristics of the cured molded article. The amounts of filler included in the polyester resin formulations may vary up to about 70% by weight, and the amount preferred for any particular formulation can be determined readily by one skilled in the art. Useful fillers generally will have an average particle size of from about 1 to about 50 microns.

Fibrous reinforcing materials can be added to the polyester resin compositions of the invention for the purpose of imparting strength and other desirable physical properties to the cured products formed therefrom. Examples of fibrous reinforcements that can be utilized include glass fibers, asbestos, synthetic organic fibers such as acrylonitrile, nylon, polyamide, polyvinyl alcohol and polyester fibers, and natural organic fibers such as cotton and sisal. The preferred fibrous reinforcements generally will be glass fibers which are available in a variety of forms including, for example, mats of chopped or continuous strands of glass, glass fabrics, chopped glass and chopped glass strands.

The amount of fibrous reinforcing material included in the compositions of the invention can be varied over a wide range including amounts of up to about 75% although much smaller amounts will be required if any of the above described fillers are included in the formulation. The amount of fibrous reinforcing material to be utilized in any particular formulation can be determined readily by one skilled in the art.

Mold release agents also can be included in the formulations used in the method of the invention, and these are typically zinc, calcium, magnesium and lithium salts of fatty acids. Specific examples of mold release agents include zinc stearate, calcium stearate, magnesium stearate, lithium stearate, calcium oleate, zinc palmitate, etc. Amounts of up to about 5% of the mold release agent, and preferably from about 1 to about 5% of the mold release agent can be included in the mixture based upon the weight of the polyester and monomer.

Pigments also can be included in the formulations of the invention. Typical examples of pigments include carbon blacks, iron oxides, titanium dioxide and phthalocyanines. The pigment can be dispersed into the mixtures prior to extrusion as dry pigment powders or pre-dispersed forms in non-reactive carriers.

Thermoplastic polymeric materials which reduce the shrinkage of the polyester resin formulations during molding also can be included in the formulations used in the method of the invention. These thermoplastic materials produce articles having surfaces of improved smoothness. Examples of useful thermoplastic polymers include homopolymers of ethylene, styrene, vinyl toluene, alkyl methacrylates and alkyl acrylates. Additional examples of thermoplastic polymers are copolymers of: vinyl chloride and vinyl acetate; styrene and acrylonitrile; methyl methacrylate and alkyl esters of acrylic acid; methyl methacrylate and styrene; and methyl methacrylate and acrylamide. Up to about 20% of a thermoplastic polymer can be included in the mixture.

As mentioned above, the polymerization initiator, fillers, fibrous reinforcing materials, pigments, antishrink polymers or mold release agents, or mixtures thereof are dispersed into the mixture after the desired increase in viscosity has been attained. It has been found in accordance with the process of this invention that the desired free-flowing pellets are not obtained if these components are added to the polyester resin prior to undergoing a viscosity increase. Since the components are added after the desired viscosity increase, it is necessary to employ high shear mixers to adequately disperse the components in the thickened polyester resin. The useful types of high shear mixers include Banbury mixers, two roll mills, high shear compound screw extruders and similar mixers. The composition is mixed until an adequate dispersion of all of the filler and other materials is achieved. Generally, this type of mixing results in a significant increase in the temperature of the material being mixed, and this temperature must be maintained below the critical temperatures which would result in decomposition of the polymerization initiators and which would cause premature polymerization of the molding composition.

After thoroughly mixing the components in a high shear mixer, the mixture is extruded into a pellet or powder form using either a screw extruder or a ram extruder equipped with a dry face pelletizing die. Typical of such extruders are: an NRM 4.5 inch Screw Extruder and a 10 inch Barwell Single Ram Extruder. Alternatively, the mixer and extruder can comprise a single unit consisting of an extruder having a mixing zone and an extrusion pelletizing zone. Examples of commercially available continuous mixing extruders are those manufactured by FCM (Farrel Continuous Mixer); Werner Pfleriderer; and Buss-Condux.

The following examples illustrate the process of the invention. Unless otherwise indicated all parts and percentages are by weight.

EXAMPLE 1

A commercially available polyester resin comprising one mole of isophthalic acid, 2 moles of maleic anhydride, and 3.1 moles of propylene glycol having a weight average molecular weight of about 2200, an acid number of approximately 25 and a hydroxyl number of about 36 is dissolved in 30 weight percent of styrene monomer. To this polyester:styrene solution is added 1.7% by weight of formamide which is used as a thickening accelerator (available from Rohm & Haas under the general designation CM-201) and 1.7 weight percent of finely divided magnesium oxide powder.

This mixture is allowed to react for about 24 hours at room temperature, and the weight average molecular weight as measured by GPC analysis after this period is found to be about 5,000.

This polyester:styrene mixture of increased viscosity and molecular weight is mixed (23 weight percent) with the following ingredients: 5 weight percent of polyethylene powder (USI FN510), 1.2 weight percent of carbon black pigment (Plasticolors PS-2076); 0.4 weight percent of t-butyl perbenzoate; 1.2% of zinc stearate; 55 weight percent of alumina trihydrate; and 15 weight percent of ¼ inch glass fibers (Certain Teed 19A4A). A Banbury High Shear Mixer is utilized and the mixing is continued until the mixture is sufficiently mixed and a temperature of between about 70° and 80° C. is obtained. This mixture then is extruded with an NRM Screw Extruder equipped with a dry face pelletizing die. The pellets have approximate dimensions of 0.25 inch length by 0.25 inch diameter. The pellets are allowed to cool to ambient temperature and can be stored indefinitely for use in subsequent molding operations.

EXAMPLE 2

Eight hundred lbs. of a commercially available styrenated polyester resin available from Ashland Chemical Company under the general trade designation "Aropol 7020" is mixed with 1.6 lbs. of water and 14.64 lbs. of magnesium oxide. The resin comprises 70% alkyd and 30% styrene monomer, the alkyd comprising maleic anhydride, isophthalic acid and propylene glycol. The mixture is blended with a Cowles Mixer until the solution is at 32° C. Before the resin has a sufficient amount of time to react with the magnesium oxide and increase in molecular weight, the mixture is placed into containers to be held for subsequent mixing. The mixture is suitable for use when the molecular weight of the polyester resin has increased to the point where the polyester molecules exhibit entanglement coupling. This entanglement coupling can be monitored by the appearance of a plateau zone of the elastic and loss shear modulii as a function of frequency utilizing a Rheometrics Dynamic Spectrometer.

A portion (200 grams) of the above prepared polyester resin mixture exhibiting entanglement coupling is mixed on a 2-roll mill with the following ingredients:

| | |
|---|---|
| ground alumina trihydrate | 400 grams |
| t-butyl perbenzoate | 3 grams |
| carbon black | 15 grams |
| zinc stearate | 10 grams |
| ¼ inch glass fibers | 150 grams |

Mixing on the 2-roll mill is continued until a sufficient dispersion of all of the ingredients is achieved while still maintaining the temperature of the stock at less than 90° C. to avoid premature decomposition of the perbenzoate which may initiate premature gelation of the molding compound.

A portion (125 grams) of the mixture obtained from the 2-roll mill is placed in a 6 inch×6 inch compression mold heated to 150° C. The pressure on this mold is then increased to about 1000 psi for two minutes. This procedure results in cross-linking of the unsaturated polyester and the styrene to produce a solid insoluble molding composition.

EXAMPLE 3

The procedure of Example 2 is repeated except that the water is replaced by 14.64 lbs. of a thickening accelerator containing formamide which is available commercially from Rohm & Haas under the general trade designation CM-201.

EXAMPLE 4

The procedure of Example 2 is repeated except that the carbon black and zinc stearate are omitted from the mixture prepared in the 2-roll mill.

EXAMPLE 5

A sample (42.6 lbs.) of the resin composition prepared in the first paragraph of Example 2 is mixed in a No. 3D Banbury (Farrel Corporation) mixer with the following ingredients:

| | |
|---|---|
| t-butyl perbenzoate | 0.6 lbs. |
| zinc stearate | 3.6 lbs. |
| ground alumina trihydrate | 120 lbs. |
| carbon black | 3.2 lbs. |
| ¼ inch glass fibers | 30.0 lbs. |

Mixing of these ingredients is continued for a time to permit sufficient dispersion of all of the materials into a homogeneous mass while keeping the temperature of the mass below 90° C.

The homogeneous mass is fed into a Farrel 6 inch screw extruder equipped with a Farrell-Bridge pelletizer die. This pelletizer die produces 0.125 inch diameter pellets which are useful in compression, transfer and screw injection molding.

EXAMPLE 6

The procedure of Example 5 is repeated except that the homogeneous mass is placed into a 10 inch Barwell hydraulic ram extruder. This extruder is equipped with a pelletizer die which produces ¼ inch diameter pellets.

EXAMPLE 7

A polyester alkyd (1900 grams) available commercially from Pioneer Plastics under the general trade designation "Pioester 1100" comprising maleic anhydride, isophthalic acid and propylene glycol is melted by heating to a temperature of about 175° C. To this melted polyester resin is added 40 grams of magnesium oxide and 66 grams of water. Although much of the water is converted to steam, the water does initiate the polyester-magnesium oxide interaction. After the magnesium oxide is added, about 15 minutes of mixing is required to produce entanglement coupling of the polyester resin as demonstrated by producing a plateau zone in the elastic and the loss shear modulii when plotted against frequency utilizing a Rheometrics Dynamic Spectrometer.

The mixture is cooled to room temperature, and 140 grams of the reaction mixture is mixed on a 2-roll mill with the following ingredients:

| | |
|---|---|
| styrene | 60 grams |
| t-butyl perbenzoate | 3 grams |
| zinc stearate | 10 grams |
| carbon black | 15 grams |
| ground alumina trihydrate | 400 grams |
| ¼ inch glass fibers | 150 grams |

The ingredients are mixed on the mill until there is a sufficient dispersion of all of the ingredients to form a homogeneous mass while keeping the temperature of the mass below 90° C. The homogeneous mass then is converted to ¼ inch diameter pellets.

The curable solid polyester resin pellets and powders prepared in accordance with the invention and the specific examples can be molded and cured to useful articles such as appliance housings and electrical equipment components utilizing injection or transfer or compression molding techniques. Molding and curing pressures and temperatures which are used with other types of curable polyester resin compositions can be used to mold and cure the solid polyester resins of the present invention. Typical molding pressures of about 200 to 2000 psi and typical temperatures of about 120° to 180° C. can be utilized. Specific examples of molded parts which can be prepared from the curable pellets and powders of the invention include electrical circuit breakers, electrical switch gear, and appliance handles.

I claim:

1. A method of preparing curable solid polyester resin pellets and powders which are suitable for use in injection, compression or transfer molding operations comprising
   (a) preparing a liquid mixture consisting essentially of an unsaturated polyester resin, at least one monomeric unsaturated polymerizable material containing a terminal ethylene group, and an alkaline earth metal oxide or hydroxide in an amount effective to provide a viscosity for said mixture characterized by a plateau region in the viscoelastic spectrum of said mixture,
   (b) allowing the liquid mixture to stand until the alkaline earth metal oxide or hydroxide and the polyester co-react, and a desired increase in viscosity characterized by a plateau region in the viscoelastic spectrum of said mixture has been attained, then
   (c) dispersing in the mixture obtained in (b) with high shear mixing, a polymerization initiator and a filler, fibrous reinforcing material, pigment or mold release agent, or mixture thereof, the temperature of said mixture being increased during step (c) to a level suitable for extrusion,
   (d) maintaining the temperature of the mixture obtained in step (c) at a level suitable for extrusion and extruding said mixture to form dry, free-flowing pellets or powders.

2. The method of claim 1 wherein the liquid mixture of (a) contains an alkaline earth metal oxide.

3. The method of claim 1 wherein the monomeric unsaturated polymerization material is a styrene.

4. The method of claim 1 wherein the liquid mixture prepared in (a) contains about 3 to 5 parts by weight of monomeric material for each 10 parts of polyester resin.

5. The method of claim 2 wherein the alkaline earth metal oxide is magnesium oxide.

6. The method of claim 1 wherein the mixture in (a) contains from about 1 to above 5% by weight of an alkaline earth metal oxide.

7. The method of claim 1 wherein the mixture of (a) also contains water or an organic thickening accelerator.

8. The method of claim 1 wherein the dispersing in (c) is effected in a high shear mixer while maintaining the temperature of the mixture below the decomposition temperature of the polymerization initiator.

9. The method of claim 1 wherein the polymerization initiator is an organic peroxide or organic compound containing an azo group.

10. The method of claim 1 wherein the unsaturated polyester resin in the liquid mixture of (a) has an acid number of from about 10 to about 100.

11. A method of preparing amorphous, curable solid polyester resin pellets and powders which are suitable for use in injection, compression or transfer molding operations comprising
  (a) preparing a liquid mixture consisting essentially of an unsaturated polyester resin, from about 30 to about 50% by weight, based on the weight of the polyester resin, of an unsaturated polymerizable monomer containing a terminal ethylene group, from 0 to about 5% by weight based on the combined weight of the polyester resin and polymerizable monomer, of water or an organic thickening accelerator, and up to about 5% by weight, based on the combined weight of polyester resin and the polymerizable monomer, of magnesium oxide, with the proviso that said magnesium oxide be added in an amount effective to provide a viscosity for said mixture characterized by a plateau region in the viscoelastic spectrum of said mixture,
  (b) heating the liquid mixture until the magnesium oxide is reacted and a desired increase in viscosity characterized by a plateau region in the viscoelastic spectrum for said mixture is attained, then
  (c) dispersing into the mixture obtained in (b) with high shear mixing, an organic peroxide initiator and a filler, fibrous reinforcing material, pigment or mold release agent, or mixture thereof while maintaining the temperature of the mixture below the decomposition temperature of the peroxide initiator, the temperature of said mixture being increased during step (c) to a level suitable for extrusion, and
  (d) maintaining the temperature of the mixture obtained in step (c) at a level suitable for extrusion and extruding said mixture to form dry, free-flowing pellets or powders.

12. The method of claim 11 wherein the unsaturated polymerizable monomer included in the liquid mixture of (a) is a styrene.

13. The method of claim 11 wherein the unsaturated polyester resin used in the preparation of the liquid mixture (a) has an acid number within the range of from about 10 to about 100.

14. The method of claim 11 wherein the organic thickening accelerator of (a) is formamide.

15. A method of preparing amorphous curable solid polyester resin pellets and powders which are suitable for use in injection, compression or transfer molding operations comprising
  (a) preparing a mixture consisting essentially of an unsaturated polyester resin in a melted state and up to 5% by weight, based on the weight of the polyester resin, of an alkaline earth metal oxide or hydroxide, with the proviso that said alkaline earth metal oxide or hydroxide be added in an amount effective to provide a viscosity for said mixture characterized by a plateau region in the viscoelastic spectrum for said mixture,
  (b) heating the fluid mixture until the oxide or hydroxide is reacted and a desired increase in viscosity characterized by a plateau region in the viscoelastic spectrum of said mixture is attained, then
  (c) dispersing into the mixture obtained in (b) with high shear mixing an unsaturated polymerizable monomer containing a terminal ethylene group, an organic peroxide initiator and a filler, fibrous reinforcing material, pigment or mold release agent, or mixture thereof while maintaining the temperature of the mixture below the decomposition temperature of the peroxide initiator, the temperature of said mixture being increased in step (c) to a level suitable for extrusion, and
  (d) maintaining the temperature of the mixture obtained in step (c) at a level suitable for extrusion and extruding said mixture to form dry, free-flowing pellets or powders.

16. The method of claim 15 wherein the mixture of (a) also contains an organic thickening accelerator.

17. The method of claim 16 wherein the thickening accelerator is water.

18. The method of claim 16 wherein the thickening accelerator is formamide.

19. The method of claim 16 wherein the dispersing in (c) is effected in a high shear mixer while maintaining the temperature of the mixture below the decomposition temperature of the polymerization initiator.

20. Dry free-flowing pellets or powders prepared in accordance with the method of claim 1.

* * * * *

UNITED STATES PATENT OFFICE
CERTIFICATE OF CORRECTION

Patent No. 4,451,610      Dated May 29, 1984

Inventor(s) Jon E. Collister

It is certified that error appears in the above-identified patent and that said Letters Patent are hereby corrected as shown below:

--Please cancel claim 20.--

On the title page "20 Claims" should read -- 19 Claims --.

Signed and Sealed this

Eleventh Day of September 1984

[SEAL]

Attest:

GERALD J. MOSSINGHOFF

Attesting Officer      Commissioner of Patents and Trademarks